US008311475B1

(12) United States Patent
Harris

(10) Patent No.: US 8,311,475 B1
(45) Date of Patent: *Nov. 13, 2012

(54) PERSONAL AUDIO PLAYER WITH WIRELESS FILE SHARING AND RADIO RECORDING AND TIMESHIFTING

(75) Inventor: Scott C. Harris, Rancho Santa Fe, CA (US)

(73) Assignee: Harris Technology, LLC, Rancho Santa Fe, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 13/348,975

(22) Filed: Jan. 12, 2012

Related U.S. Application Data

(63) Continuation of application No. 12/842,537, filed on Jul. 23, 2010, now Pat. No. 8,099,040, which is a continuation of application No. 11/115,842, filed on Apr. 26, 2005, now Pat. No. 7,796,940.

(51) Int. Cl.
*H04H 7/00* (2006.01)

(52) U.S. Cl. .................. 455/3.06; 455/3.02; 455/456.1; 455/414.3; 725/35; 725/138; 725/46; 725/91

(58) Field of Classification Search ............... 455/414.1, 455/414.3, 407, 412.2, 3.06, 344, 3.01–3.04, 455/412.1, 413, 550.1, 456.1; 709/231, 203, 709/217; 725/34, 35, 81, 138, 139, 115–118, 725/46, 61
See application file for complete search history.

(56) References Cited

U.S. PATENT DOCUMENTS

| | | |
|---|---|---|
| 3,604,900 A | 9/1971 | Kalt |
| 3,850,426 A | 11/1974 | Blair |
| 4,608,486 A | 8/1986 | Berstein et al. |
| 4,614,861 A | 9/1986 | Pavlov et al. |
| 4,672,661 A | 6/1987 | Clark, Jr. et al. |
| 4,701,601 A | 10/1987 | Francini et al. |
| 4,811,387 A | 3/1989 | Hollewed et al. |
| 4,859,837 A | 8/1989 | Halpern |
| 4,877,950 A | 10/1989 | Halpern |
| 5,049,728 A | 9/1991 | Rovin |
| 5,163,114 A | 11/1992 | Hendow |
| 5,311,003 A | 5/1994 | Saroya |
| 5,590,038 A | 12/1996 | Pitroda |
| 5,734,722 A | 3/1998 | Halpern |
| 5,815,252 A | 9/1998 | Price-Francis |
| 5,867,795 A | 2/1999 | Novis et al. |
| 5,895,909 A | 4/1999 | Yoshida |
| 6,002,767 A | 12/1999 | Kramer |
| 6,016,429 A | 1/2000 | Khafizov et al. |
| 6,044,360 A | 3/2000 | Picciallo |
| 6,142,369 A | 11/2000 | Jonstromer |
| 6,145,739 A | 11/2000 | Bertina et al. |
| 6,145,748 A | 11/2000 | Neifer et al. |
| 6,188,402 B1 | 2/2001 | Csipkes et al. |

(Continued)

FOREIGN PATENT DOCUMENTS

WO 9633475 10/1996

(Continued)

*Primary Examiner* — Sujatha Sharma
(74) *Attorney, Agent, or Firm* — Law Office of Scott C. Harris, Inc.

(57) ABSTRACT

A portable MP3 player, which includes radio capability therein. The device includes a radio part which enables receiving radio, either over the airwaves, or via a network. The radio information can be time shared for later use, and sequences within the radio information can be identified for storage within the memory. The memory can store compressed information, such as MP3 information, indicative of songs which are stored. The memory can also store information that is received over the radio.

20 Claims, 2 Drawing Sheets

U.S. PATENT DOCUMENTS

| | | |
|---|---|---|
| 6,219,429 B1 | 4/2001 | Chung |
| 6,257,486 B1 | 7/2001 | Teicher et al. |
| 6,394,341 B1 | 5/2002 | Makipaa et al. |
| 6,409,086 B1 | 6/2002 | Pellaumail et al. |
| 6,457,647 B1 | 10/2002 | Kurihashi et al. |
| 6,609,199 B1 | 8/2003 | DeTreville |
| 6,636,833 B1 | 10/2003 | Flitcroft et al. |

FOREIGN PATENT DOCUMENTS

| | | |
|---|---|---|
| WO | WO 9633475 | 10/1996 |

PERSONAL AUDIO PLAYER WITH WIRELESS FILE SHARING AND RADIO RECORDING AND TIMESHIFTING

CROSS-REFERENCE OF RELATED APPLICATIONS

This application is a continuation application of U.S. Ser. No. 12/842,537 filed Jul. 23, 2010, now U.S. Pat. No. 8,099,040 issued Jan. 17, 2012; which is a continuation application of Ser. No. 11/115,842 filed Apr. 26, 2005 filed Apr. 26, 2005, now U.S. Pat. No. 7,796,940 issued Sep. 9, 2010. The disclosures of these parent applications are hereby incorporated by reference, in their entirety.

BACKGROUND

Personal audio players, such as the Apple iPod, store compressed music information in a storage unit, and enable a user to listen to their own personal music, on a portable device. These devices conventionally store the music in either MP3 format, or in some other compressed format. The format for storage enables a fixed-size storage device to actually store more information. A user interface on the device may include a selector and display screen that enables the user to select a particular object to be listened to. For example, the user may select a song or a playlist and listen to that song or playlist.

SUMMARY

The present application teaches new aspects which can be included within the existing circuitry within such a portable audio device. A first aspect includes a radio, and includes control of the radio in a way that allows effectively timeshifting the radio content. The user can listen to radio content which occurred sometime prior to the current-listening high. The user can also fast forward over certain parts, to enable the user to listen to only certain desired portions of the program. In addition, since the contents of the radio are compressed and stored, another aspect enables the user to store clips from the radio sequence for later playback.

Another aspect relates to a wireless capability of such a personal audio player. The wireless capability enables connection to a backbone, and enables retrieving either streaming content or other content from that wireless backbone. For example, this may enable playing an Internet radio station based on wireless communication.

BRIEF DESCRIPTION OF THE DRAWINGS

These and other aspects will now be described in detail with reference to the accompanying drawings, wherein.

DETAILED DESCRIPTION

Figure 1:
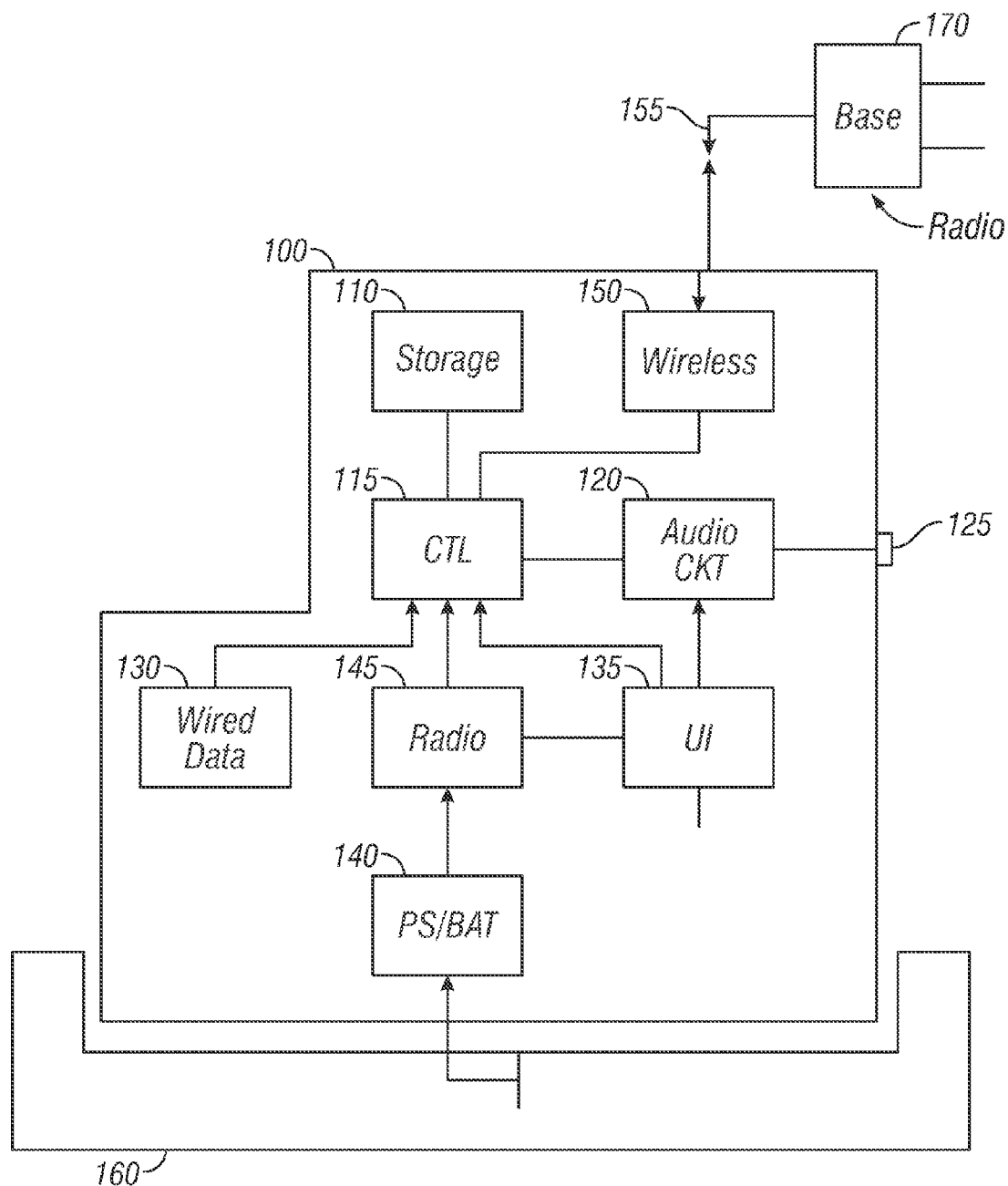
FIG. 1 shows a block diagram of the overall system.
Figure 2:
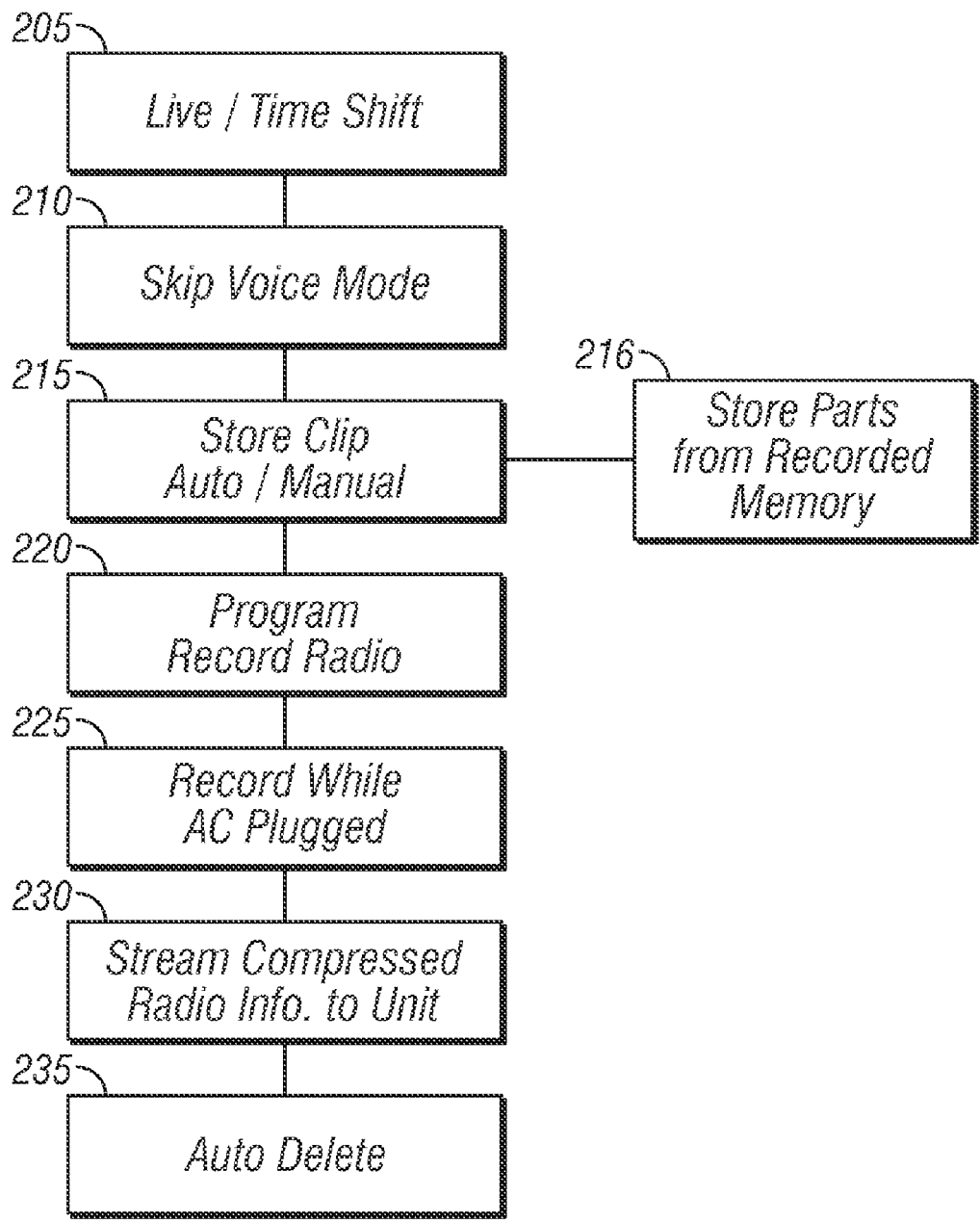
FIG. 2 shows a flowchart of operation.

A block diagram of the overall system is shown in FIG. 1. The unit 100 is a portable personal audio unit. A storage 110 which may be fixed or removable, stores the audio information, in preferably compressed digital form. For example, storage 110 may store between 1 MB and 400 MB of digital MP3 information in an embodiment. A controller 115 may control compression of audio information for storage into the storage unit 110, decompression of the audio information, and also control of the various functionalities. The control 115 may be more than one device, for example it may include a microprocessor and a dedicated compressor and/or decompressor IC chip. The decompressed audio information is sent to an audio circuit 120, which may be a low wattage audio amplifier that produces an earphone output 125. The system also includes an interface to a wired data connection 130. For example, this may be conventional USB connection, or maybe any of the connection which enables data from an external source to be entered into and/or removed from the storage unit 110.

The overall control is controlled by the user interface 35 which may be a selector device and may include a screen to enable displaying the contents of what is possible to play or what is currently playing or more. A power supply 140 may include a battery, preferably a rechargeable battery, that powers the entire unit.

The system also includes a radio 145 which may be a dedicated chip or maybe part of one of the other chips described above. The radio may be a radio tuner with its antenna embedded into the case of the unit 100. Tuning may be controlled by the user interface 135. The system also includes a wireless connection 150 which may be a short-range connection such as Bluetooth, a mesh connection such as Zigbee, or a more conventional wireless ethernet connection such as 802.11. In an embodiment, the wireless connection 150 is adapted for short-range communications, so that it can receive communications when it comes within range of an appropriate communication system. In the embodiment which uses Zigbee, the wireless communication becomes part of a low-power mesh network, where each wireless unit transmits to a next wireless unit in the mesh.

In operation, the radio can play in a number of different modes. The radio can play live in which its output may be directly coupled through to the output connector 125. The radio can also play in time shifted mode. In a time shifted mode, review of contents are stored, after compression by control 115, into the storage unit. The current contents of the radio are stored, while previous contents of the radio are retrieved and sent to the audio jack 125. The user can, from the user interface, control what audio is being listened to. For example, the radio may store a continual amount of storage time for example one hour of storage. The user can listen to different parts of the radio, and skip certain content. In one aspect, the controller 115 automatically identifies whether the content being retrieved is voice or music. In a skip voice mode, the system automatically skips all talking, and plays only music.

Another aspect relates to storage of certain clips from the radio. For example, the user may signal, while listening to a particular song, that the user wants to store this song to listen to again later. The controller automatically identifies the beginning of the song, by identifying the start of the music portion. The controller marks that start portion as the beginning portion for clip number X. At the end of the song, the controller automatically identifies this, also, and marks as the end of clip number X. The song is therefore stored as clip number X, into the storage unit 110, enabling the user to retrieve that song and play it again later.

Different refinements of this system are possible. In one refinement, the user and may signal the beginning and end of the clip manually. During any song, the user selects storage, on the user interface. At that point, the user can rewind through the stored previously recorded material. The user selects start that allows manual selection of a clip from the received radio. Another aspect enables selection of a clip from live radio. During the time that the user is playing live radio, in addition to being sent to the audio circuit 120, the information may be continually compressed and sent to storage unit 110, with storage unit 110 storing, for example, 5 or 10 minutes of live radio at all times. This enables rewinding live radio, to find the beginning of the song, either automatically or manually.

The user can also program certain radio broadcasts to be recorded. For example, if the user likes a certain radio show, the user may program that radio show to be recorded. User interface, the user selects record channel 99 by from 9 a.m. to 10:30 p.m. The system automatically records this, stores and within the storage 110, and enables the user to play this back as a music clip at some later time.

All of this may be relatively battery intensive, and one aspect enables doing this on a portable device. Of course this may also be done on a non-portable device. Therefore, another aspect includes recording radio transmissions for later listening automatically whenever the device is connected to its charging station, to avoid reducing battery life.

Yet another aspect enables the radio to be recorded at a base station. The radio thus recorded is then streamed into the unit over the wireless link 155, to the wireless unit 150. The radio thus recorded may be alternatively sent as wired data, the next time that the unit is synced or docked. Again, the radio show then becomes something which is listened to by the user.

Other information can be received over the wireless link 155. For example, when the unit comes with range of a wireless source, it may automatically begin receiving information, or signal to the user that information is available for receive. The wireless information, for example, may be an information channel, which is transmitted within an area to provide information to people on certain things. For example in a shopping mall it may be specials about the shopping mall, or information about how to do certain things in the shopping mall. In a public exhibition, such as the zoo or art museum, the information may be information about certain exhibits, which is automatically transmitted when the user gets close to the exhibits. Alternatively, the information transmitted may be for example an entire corpus of information for all exhibits, listed by exhibit numbers, stored in the storage unit. The user can then select any of the numbers, as they reach the exhibit, and listen to those. Another aspect may include an auto delete option. When information is received over a wireless unit, the user may automatically prompted, after leaving the area of the wireless unit, about whether they wish to delete the information. The information would then be completed sometime after the meetings, say 3 to 4 hours after leaving the area. This would enable a mean prevent the information from being automatically deleted simply because the user gets to an area of low of wireless reception. The user can, of course, shoes to retain parts of the information in the store, and can select portions of that information as lips.

Other aspects are within the disclosed embodiment.

What is claimed is:

1. A portable computer system, comprising:
an audio circuit, which produces an audio output indicative of information that is received by said audio circuit;
a storage device, which stores information to be played by said audio circuit;
a controlling part, which controls operations including operations to store information in said storage device and to retrieve stored information from said storage device, said controlling part also controlling a user interface that can be interacted with by a user to store said information in said storage device and to retrieve and play said stored information from said storage device;
a network communication device, which includes a wireless part which communicates wirelessly over at least one wireless network and also includes a wired part which communicates with a wired network;
a battery, which provides power for at least said storage device, said controlling part, said user interface and said network communication device; and
a power connection, which receives power to charge said battery when connected;
said controlling part detecting when said portable computer system is connected and receiving said power over said power connection, and automatically recording first information only when said portable computer is connected and receiving said power over said power connection, and not recording said first information when said portable computer system is not connected and receiving said power over said power connection.

2. The portable computer system as in claim 1, wherein said first information is a recording of radio transmissions.

3. The portable computer system as in claim 1, wherein said first information is music that has been created at a previous time.

4. A portable computer system as in claim 1, wherein said first information includes individual songs of music.

5. The portable computer system as in claim 1, wherein said communication to the wired network is over a same connector that receives said power connection.

6. The portable computer system as in claim 1, wherein said controlling part also controls recording current information as recorded current information and storing said recorded current information into said storage device.

7. A portable computer system as in claim 6, wherein said current information is of radio broadcasts.

8. The portable computer system as in claim 1, wherein said wireless part communicates with a wireless network automatically when in range of the wireless network, to receive first information automatically from the wireless network, and to send said information automatically to other client computers that are within range of the wireless part.

9. A portable computer as in claim 8, wherein said controlling part controls recording the first information and storing the recorded first information in said storage device, and the controlling part controls later playing back the first information that has been stored in said storage device.

10. A portable computer system, comprising:
an audio circuit, which produces an audio output indicative of information that is received by said audio circuit;
a storage device, which stores information to be played by said audio circuit;
a controlling part, which controls operations including operations to store information in said storage device and to retrieve stored information from said storage device, said controlling part also controlling a user interface that can be interacted with by a user to store said information in said storage device and to retrieve and play said stored information from said storage device;
a network communication device, which includes a wireless part which communicates wirelessly over at least one wireless network; and
a battery, which provides power for operating at least said storage device, said controlling part, said user interface and said network communication device;
said controlling part controlling automatically receiving communications over said wireless network, to automatically receive communications when within range of a communicating wireless network, and storing at least part of said communications in said storage device.

11. The portable computer system as in claim 10, wherein said controlling part controls, when receiving said communications over said wireless network, automatically communicating with another portable computer system that is in range of the network communication device which is different than a source from which said communications was received.

12. The portable computer system as in claim 10, wherein said network communication device also includes a connection to power to charge said battery, and a connection to a wired network on a same connector that receives charge for said battery.

13. The portable computer system as in claim 10, wherein said controlling part also controls recording currently received information and storing recorded information into said storage device.

14. A portable computer system as in claim 10, wherein said communications over said wireless network includes broadcasts of music over the wireless network.

15. A portable computer system as in claim 10, wherein said communications over the wireless network includes information about a local area.

16. A method of operating a portable computer, comprising:
    storing information to be played in a storage device;
    using the computer to control operations including operations to store information in said storage device and to retrieve stored information from said storage device, based on commands received over a user interface;
    producing an audio output indicative of said information to be played responsive to retrieving said information from said storage device;
    powering circuits including at least said storage device, said controlling part, from a battery;
    receiving power to charge said battery and detecting when said power to charge the battery is being received;
    communicating wirelessly over at least one wireless network from the computer;
    storing first information in said storage device only when said power to charge said battery is being received, and not storing said first information in said storage device when said power to charge the battery is not being received.

17. The method as in claim 16, wherein said first information includes individual songs of music.

18. A method as in claim 16, wherein said communicating over the wired network is over a same connector that receives said first information.

19. The method as in claim 16, wherein said communicating wirelessly comprises communicating automatically over the wireless network when in range of the wireless network, to receive first information automatically from the wireless network, and to send said information automatically to other computers who are within range of the wireless communication.

20. The method as in claim 16, further comprising controlling recording the first information and storing recorded first information in said storage device, and later playing back the first information that has been stored in said storage device.

* * * * *